Feb. 18, 1969   J. B. GAG   3,428,883
ALTERNATING CURRENT GENERATOR VOLTAGE REGULATOR
Filed July 11, 1966   Sheet 1 of 2

VECTOR DIAGRAM UNDER LOAD CONDITIONS

VECTOR DIAGRAM UNDER NO LOAD CONDITIONS

United States Patent Office 3,428,883
Patented Feb. 18, 1969

3,428,883
ALTERNATING CURRENT GENERATOR
VOLTAGE REGULATOR
Joseph B. Gag, Stamford, Conn., assignor to Textron,
Inc., Providence, R.I., a corporation of Rhode Island
Filed July 11, 1966, Ser. No. 564,273
U.S. Cl. 322—28                                6 Claims
Int. Cl. H02p 9/10, 9/14, 11/00

ABSTRACT OF THE DISCLOSURE

A voltage regulating system for an alternator having an armature and a field comprises a full wave rectifier having input terminals connected to the armature of the alternator and output terminals connected to the field, a current transformer having a first winding connected in series with the alternator load and a second winding connected to the input of the rectifier and a resistance connected between the armature and the rectifier to balance impedances of the circuit.

---

The present invention relates to a voltage regulating system for alternating current generators, herein referred to generically as alternators.

It is an object of the invention to provide a simple static system for compensating the output voltage of an alternator in accordance with changes of load. Compensation is accomplished with a minimum number of components and no moving parts. The entire system uses only solid state rectifiers, a transformer and—in some cases—a resistance so that it is economical and highly dependable.

An alternator comprises an armature winding which is electrically connected to the load to which alternating current is to be supplied and a field winding to which direct current is supplied to provide a magnetic field. An alternator may have a stationary field and rotating armature or it may have a stationary armature and rotating field.

In a simple type of alternator, direct current for the field is supplied through a suitable rectifier connected across the output terminals of the armature. A field winding connected in this manner is referred to as shunt connected or as a shunt field winding. With a shunt connected field winding, the output voltage of an alternator tends to decrease as the load on the alternator increases. Improved characteristics can be obtained by providing the field with a second winding supplied with direct current through a second rectifier connected in series with the load so that load current passes through the second winding—called a series connected winding. As the load increases, the resulting increase of current through the series connected winding of the field provides increased flux to compensate for the increased internal voltage drop in the alternator armature.

The present invention is applicable to both rotating armature alternators and rotating field alternators. As applied to an alternator with a rotating armature, the invention makes it possible to obtain good voltage regulation with the use of a single field winding, thereby avoiding the need of an additional series connected winding and an additional rectifier to supply current to it.

A rotating field alternator has important advantages over a rotating armature alternator. Since the armature winding is stationary, the load current—which is relatively heavy—can be brought out through fixed connections rather than through slip rings. Moreover, the design of rotating field alternators makes possible the manufacture of alternators of different output capacities largely from standard parts. For example, alternators having a range of different ratings can all be made of the same diameter with different lengths. Hence many parts such as end bells, bearings, slip rings, brush assemblies, outlet sockets, armature laminations and field laminations can be the same for all sizes, thereby reducing manufacturing costs and simplifying the stocking of parts for manufacture and for repair.

However, the use of compound field windings in a stationary armature machine leads to complications in that it is necessary to have an additional, series connected winding, an additional rectifier capable of handling load currents and at least three slip ring and brush assemblies, of which two must be sufficiently heavy to conduct load current.

The present invention is particularly advantageous as applied to stationary armature alternators in that compensation of output voltage can be achieved with only a single field winding supplied with direct current through a single pair of collector rings and brushes. Moreover, the field current is of the same order of magnitude for different alternator ratings over a substantial range, for example 1 kw. to 5 kw., thereby further contributing to the production of alternators of different capacities with standard parts.

A further advantage of the voltage regulating system in accordance with the present invention is that it has short circuit characteristics which make it suited for heavy overloads, such as those imposed in starting electric motors. Moreover, initial buildup of voltage is limited only by the threshold voltage of the rectifiers and the resistance of the circuit, there being no high reactance in the field circuit. It is therefore not necessary to use permanent magnets in the alternator to insure buildup of voltage. This further simplifies the manufacture of alternators and reduces their cost.

The characteristics and advantages of the invention will appear more fully from the following description of preferred embodiments in conjunction with the accompanying drawings in which.

Figure 1:
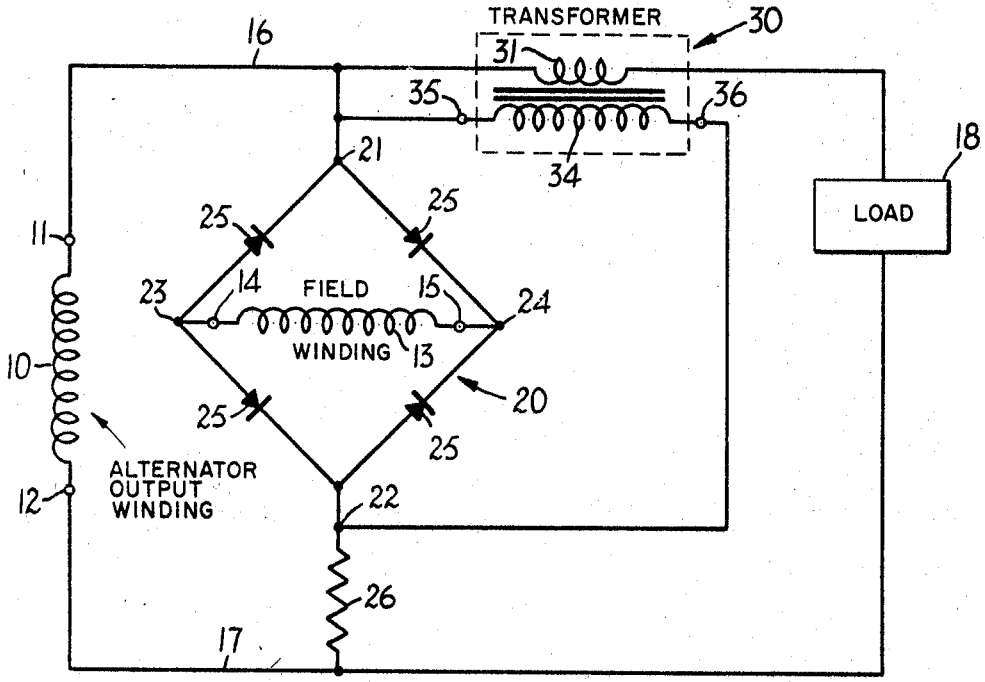
FIG. 1 is a circuit diagram of a voltage regulating system in accordance with the invention.

In FIGURE 1 there is shown an alternator having an armature 10 with output terminals 11 and 12, and a field winding 13 with terminals 14 and 15. The output terminals 11 and 12 of the alternator are connected by conductors 16 and 17 to a load 18 to supply alternating current to the load.

A full wave rectifier 20 having input terminals 21 and 22 and output terminals 23 and 24 is shown as comprising four solid state rectifiers 25. The input terminals 21 and 22 of the rectifier 20 are connected across the output terminals 11 and 12 of the alternator. A resistance 26 is connected in series with the rectifier. The output terminals 23 and 24 of the rectifier 20 are connected to the terminals 14 and 15 of the field winding 13 so as to supply direct current to the alternator field. In the case of a rotating field alternator, connections to the field require only two collector rings and two brushes.

In accordance with the invention, the primary winding 31 of a transformer 30 is connected in series with the load 18 so that alternating current supplied by the alternator to the load passes through the primary of the transformer.

The secondary winding 34 of the transformer 30 has terminals 35 and 36 which are connected respectively to the input terminals 21 and 22 of the rectifier 20.

As the load current of the alternator increases, the field current fed to the field winding by the secondary of the transformer 30 correspondingly increases so as to compensate the output voltage of the alternator for increase of load. The characteristics of the transformer 30 are selected to provide the voltage regulating characteristics that are desired. If, for example, it is desired to maintain the voltage at alternator terminals 11 and 12 substantially constant, the transformer is selected so as to provide field current for compensating internal losses in the alternator with increase of load. Alternatively, if it is desired to provide over-compensation so that the terminal voltage of the alternator is increased with increase of load so as to compensate for line drop and provide substantially constant voltage at the load, the transformer 30 is selected to provide a greater increase in field current with increase of load.

The transformer 30 is in effect a current transformer which provides increased secondary voltage with increase of current in the primary. The ratio of turns in the winding of the secondary and primary of the transformer is selected in accordance with the resistance of the field winding and the regulating characteristics desired and may, for example, be of the order of ten or twelve turns in the secondary winding to one in the primary winding.

The value of the resistance 26 is likewise selected in accordance with the characteristics desired and also in accordance with the size of the generator, being larger for a smaller generator. Factors affecting full load voltage are the armature winding 10, field winding 13, the size and ratio of the transformer 30 and, to a lesser extent, the resistance of the resistor 26. When the other parameters of the machine have been approximately determined, the resistance of the resistor 26 is selected to provide the desired no-load voltage. Typical examples of the value of the resistance 26 are 100 ohms for a 1½ kw. generator and 50 ohms for a 3½ or 5 kw. generator.

Figure 2:
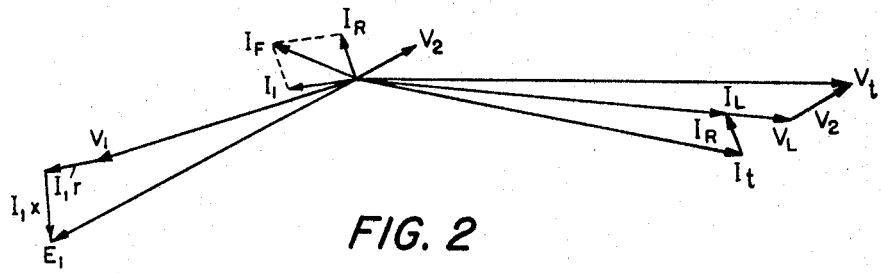
FIG. 2 is a vector diagram showing the relation of voltages and currents in the circuit under load conditions.
Figure 3:
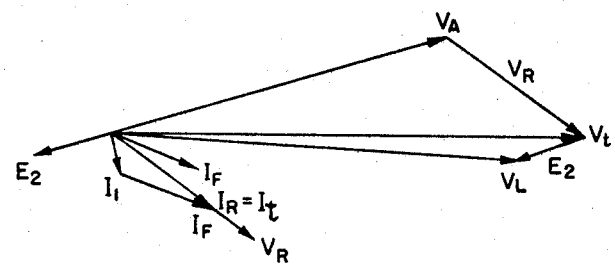
FIG. 3 is a vector diagram showing the relation of currents and voltages in the circuit under no load conditions.

FIGURES 2 and 3 illustrate typical vector diagrams of the voltage regulating system illustrated in FIG. 1 under load condition and no load conditions respectively. The symbols appearing in FIGURES 2 and 3 are identified as follows:

$E_1$=internal induced voltage in transformer secondary
$E_2$=induced voltage in transformer primary
$I_1$=transformer secondary load current
$I_{lr}$=resistance drop in transformer secondary
$I_{lx}$=reactance drop in transformer secondary
$I_F$=A.C. current to rectifier-field circuit
$I_L$=load current
$I_R$=resistor current
$I_t$=output current of armature
$V_1$=voltage output of transformer at its terminals
$V_2$=voltage drop across transformer primary
$V_A$=applied voltage to transformer secondary
$V_L$=voltage at load terminals
$V_R$=voltage across resistor
$V_t$=voltage output at generator terminals It will be noted that under a typical load condition as shown in FIG. 2 the field current ($I_F$) lags the voltage output ($V_1$) of the transformer 30 at its terminals with a power factor of approximately 0.70. The internal induced voltage in the transformer secondary ($E_1$) is displaced approximately 180° from the voltage across the transformer primary ($V_2$).

The following vectorial relationships pertain:

$$I_t=I_R+I_L$$
$$I_F=I_R+I_1$$
$$V_t=V_L+V_2$$
$$V_t=V_1+V_R$$

Under no load conditions as illustrated in FIG. 3, the field current ($I_F$) lags the terminal voltage ($V_A$) of the secondary of the transformer with a power factor of approximately 0.60 to 0.70. The current in the secondary winding of the transformer ($I_1$) lags the voltage applied to the terminals of the transformer secondary with a power factor of approximately zero. The terminal voltage ($V_t$) of the alternator and the load voltage ($V_L$) are almost in phase. The following vectorial relationships pertain.

$$V_t-E_2=V_L$$
$$V_A+V_R=V_t$$
$$I_t=I_R$$
$$I_F+I_1=I_R$$

Under no-load conditions, the secondary of the transformer 30 acts as a primary and induces a voltage in the primary winding 31 almost in direct opposition to the alternator voltage, thus holding the output terminal voltage at approximately a rated value, or other value as desired. As load is applied, the primary and secondary of the transformer 30 reverse their roles, and the load current in the primary 31 of the transformer 30 produces a current in the secondary winding 34 in inverse proportion to the turn ratio. As the load increases, the increased current in the transformer primary induces an increased voltage in the secondary of the transformer. This is reflected as an increased voltage across the rectifier-field circuit, causing a higher current to flow in the field. With proper proportioning, the field current under load conditions is increased in proportion to the load current so as to achieve the desired regulating action.

Maximum losses in the resistance 26 occur at no load and decrease with increase of the load so that at full load the losses in the resistance are low, thereby improving the efficiency of the system at full load. The resistance may conveniently be installed internally of the generator. Since its greatest losses occur under no load conditions when the losses of the generator are low, it does not increase the temperature of the generator parts above the temperature at full load. As the load increases, the losses in the resistance decrease to a low value so that they contribute very little to temperature rise of the generator.

Figure 4:
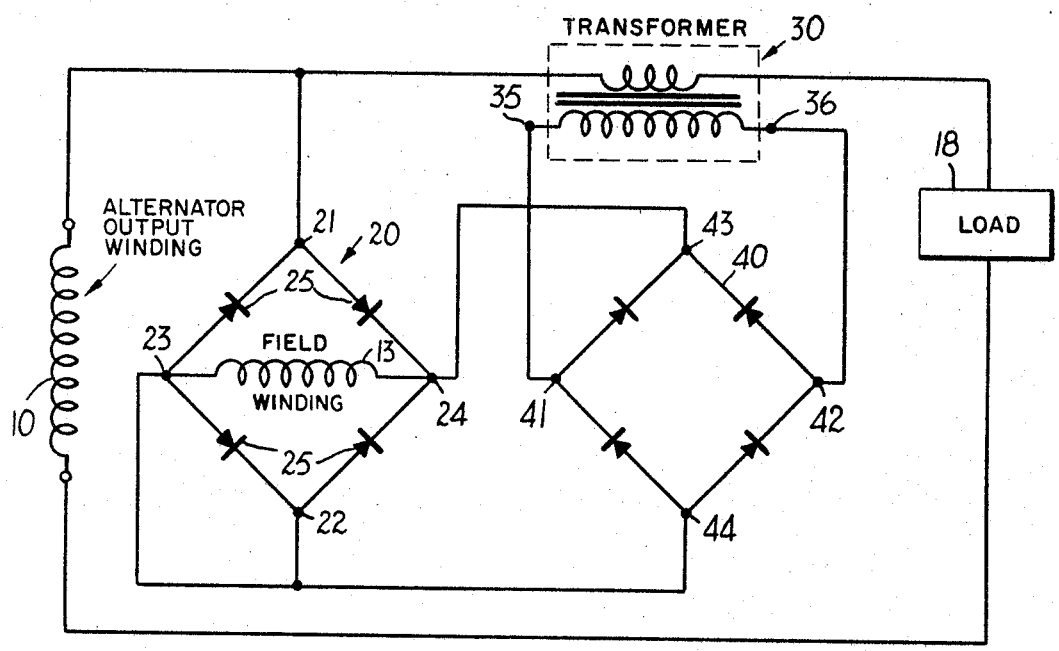
FIG. 4 is a circuit diagram of another embodiment of a voltage regulating system.

In FIG. 4 there is shown a modified circuit in which the resistance 26 is omitted, and there is a second rectifier 40 similar to the rectifier 20 and having input terminals 41 and 42 connected respectively to the terminals 35 and 36 of the secondary of the transformer 30 and output terminals 43 and 44 connected respectively to the output terminals 23 and 24 of the rectifier 20. The circuit shown in FIG. 4 has characteristics similar to that of FIG. 1 except that at no load there is no reduction of terminal voltage due to reversal of action of the primary and secondary windings of the transformer 30.

Figure 5:
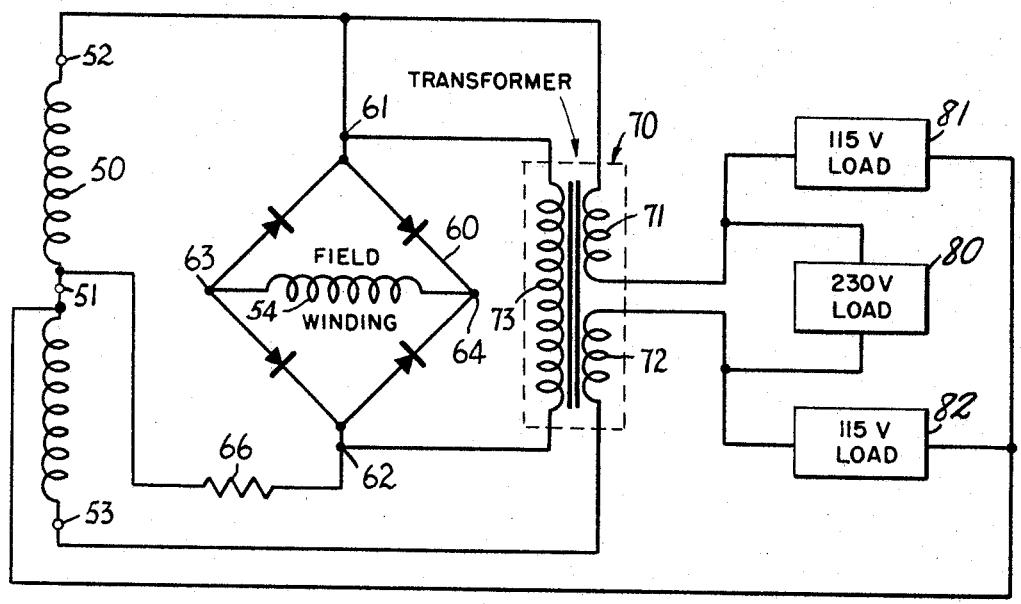
FIG. 5 is a circuit diagram of a voltage regulating system for an alternator having a three terminal two voltage output.

In FIGURE 5, there is shown a voltage regulating system applied to an alternator having three output terminals for supplying current to loads at two different voltages, for example, a 115–230 volt system. The armature 50 of the alternator has a neutral terminal 51 and outside or power terminals 52 and 53. A rectifier 60 similar to the rectifier 20 of FIG. 1 has input terminals 61 and 62 connected across terminals 51 and 52 of the armature with a resistance 66 connected in series with the rectifier. Output terminals 63 and 64 of the rectifier are connected to the field winding 54 of the alternator. A transformer 70 has two primary windings 71 and 72, which are connected in series between the load and the output terminals 52 and 53 respectively of the alternator. A secondary winding 73 of the transformer 70 has output terminals connected respectively to the input terminals 61 and 62 of the rectifier 60. It will be noted that there are provisions for connecting a load 80 across terminals 52 and 53 and also for connecting loads 81 and 82 between each of these terminals and the neutral terminal 51 of the alternator.

Instead of being connected between terminals 51 and 52 of the armature as shown, the field may be connected between terminals 51 and 53 or between 52 and 53. If the field is connected between terminals 52 and 53, the field winding 54 and the secondary winding of the transformer 70 are designed for the higher voltage appearing across these terminals.

The operation and characteristics of the circuit shown in FIG. 5 are essentially the same as those of the circuit illustrated in FIG. 1. By providing the transformer 70 with two primary windings as shown, the system is made responsive to load changes in both branches of the load circuit. The two primary windings of the transformer are preferably identical. Splitting the primary of the transformer as shown, assists in proper regulation of the voltage even when the loads on the two branches of the output circuit of the alternators are unbalanced. Typical values of the resistance of resistor 66 are 100 ohms for an alternator having a capacity of 1½ kw. and 50 ohms for alternators having capacities of 3½ or 5 kw.

With a regulating system in accordance with the present invention, initial buildup of voltage of the alternator is limited only by the threshold voltage of the rectifiers and the resistance of the field and of the resistance 26 or 66. It has been found that with a circuit of this kind, voltage will build up quickly when the generator is started without the need of incorporating permanent magnets in the field of the alternator.

It will thus be seen that the present invention provides a simple and inexpensive voltage regulating system which in practice has been found to be highly efficacious.

It will be understood that while preferred embodiments of the invention have been illustrated in the drawings and particularly herein described, the invention is not limited to the details of the illustrated embodiments and that modifications and variation may be made within the scope of the appended claims.

What I claim is:

1. A voltage regulating system for an alternator having an armature winding and a field winding each of said windings having terminals, said system comprising means for connecting the armature of the alternator to a load, a full wave rectifier having input terminals and output terminals, means connecting input terminals of said rectifier respectively to the terminals of said armature winding, means connecting output terminals of said rectifier means respectively to said terminals of the field winding of the alternator to supply direct field current to said alternator, a transformer having a first winding and a second winding, each of said windings having terminals, means connecting said first winding in series with the load so that at least part of the load current passes through it, means connecting the output terminals of said second winding with input terminals of said rectifier whereby the rectified output of said second winding is superposed on the field current of said alternator, and a resistance of selected value connected in series between said input terminals of said rectifier means and the terminals of said armature winding.

2. A voltage regulating system according to claim 1, in which said armature of the alternator has three terminals comprising two outside terminals and a neutral terminal for the connection of load between said outside terminals and between each of said outside terminals and said neutral terminal and in which said first winding of said transformer comprises a portion connected in series between one of said outside terminals and load and another portion connected between the other of said outside terminals and load.

3. A voltage regulating system according to claim 2, in which said portions of said first transformer winding are equal to one another.

4. A voltage regulating system according to claim 2, in which said input terminals of said rectifier means are connected respectively to one of said outside terminals and said neutral terminal of said alternator.

5. A voltage regulating system for a single phase alternator having a stationary armature winding and a rotating direct current field winding, each of said windings having terminals, said system comprising a full wave rectifier having four solid state rectifier elements with input terminals between a first and second element and between third and fourth element and output terminals between a second and third element and between a fourth and first element, means connecting the output terminals of said rectifier to the field winding terminals of the alternator, means connecting output terminals of the armature winding of the alternator to the input terminals of said rectifier, a current transformer having a first winding and a second winding with more turns than said first winding, each of said transformer windings having terminals, means connecting said first winding to the output terminals of said alternator in series with a load so that at least part of the load current passes through said first winding, means connecting terminals of said second winding of the transformer respectively to the input terminals of said rectifier, and resistance means connected between the output terminals of the alternator and the input terminals of said rectifier to control the power supplied respectively by said alternator output terminals and said second winding to the input of said rectifier.

6. A voltage regulating system according to claim 5, in which said armature of the alternator has three terminals comprising two outside terminals and a neutral terminal for connection of a load between said outside terminals and other loads between each of said outside terminals and said neutral terminal, and in which said first winding of said transformer comprises a portion connected in series between one of said outside terminals and load and a second like portion connected in series between the other of the outside terminals and load.

References Cited

UNITED STATES PATENTS

| 2,749,500 | 6/1956 | Eagan | 322—28 |
| 3,254,293 | 5/1966 | Steinbruegge et al. | 322—28 X |
| 3,344,338 | 9/1967 | Sparrow | 322—75 |

ORIS L. RADER, *Primary Examiner.*

H. HUBERFELD, *Assistant Examiner.*

U.S. Cl. X.R.

322—75